(12) United States Patent
Schachter

(10) Patent No.: US 9,105,045 B1
(45) Date of Patent: Aug. 11, 2015

(54) SYSTEM, METHOD, AND COMPUTER PROGRAM PRODUCT FOR ALTERING AN EXPERIENCE OF A USER, BASED ON INFORMATION ASSOCIATED WITH A PARTY TO A COMMUNICATION ASSOCIATED WITH THE USER

(75) Inventor: Erez Schachter, Brookline, MA (US)

(73) Assignee: Amdocs Software Systems Limited, Dublin (IE)

( * ) Notice: Subject to any disclaimer, the term of this patent is extended or adjusted under 35 U.S.C. 154(b) by 1318 days.

(21) Appl. No.: 12/035,658

(22) Filed: Feb. 22, 2008

(51) Int. Cl.
*G06Q 30/02* (2012.01)
*G06Q 50/00* (2012.01)

(52) U.S. Cl.
CPC ........ *G06Q 30/0251* (2013.01); *G06Q 30/0256* (2013.01); *G06Q 50/01* (2013.01)

(58) Field of Classification Search
CPC  G06Q 50/01; G06Q 30/0251; G06Q 30/0256
USPC ................ 709/201, 203, 204, 206, 224, 230; 707/3, 104.1; 379/93.7; 705/14
See application file for complete search history.

(56) References Cited

U.S. PATENT DOCUMENTS

| | | | | |
|---|---|---|---|---|
| 5,991,795 | A * | 11/1999 | Howard et al. | 709/201 |
| 7,467,132 | B2 * | 12/2008 | Nakayama et al. | 707/3 |
| 2002/0032735 | A1 * | 3/2002 | Burnstein et al. | 709/204 |
| 2004/0186778 | A1 * | 9/2004 | Margiloff et al. | 705/14 |
| 2006/0034434 | A1 * | 2/2006 | Kashi | 379/93.07 |
| 2006/0075044 | A1 * | 4/2006 | Fox et al. | 709/206 |
| 2006/0106866 | A1 * | 5/2006 | Green et al. | 707/104.1 |
| 2006/0200434 | A1 * | 9/2006 | Flinn et al. | 706/12 |
| 2006/0259473 | A1 * | 11/2006 | Li et al. | 707/3 |
| 2007/0185844 | A1 | 8/2007 | Schachter | 707/3 |
| 2007/0214214 | A1 * | 9/2007 | Kawakura et al. | 709/203 |
| 2008/0077561 | A1 * | 3/2008 | Yomtobian | 707/3 |
| 2008/0103907 | A1 * | 5/2008 | Maislos et al. | 705/14 |
| 2008/0140782 | A1 * | 6/2008 | Bagwell et al. | 709/206 |
| 2008/0172412 | A1 * | 7/2008 | Gruhl et al. | 707/104.1 |
| 2009/0055527 | A1 * | 2/2009 | Akiyama | 709/224 |
| 2009/0192984 | A1 * | 7/2009 | Abrams et al. | 707/3 |
| 2011/0022602 | A1 * | 1/2011 | Luo et al. | 707/748 |

OTHER PUBLICATIONS

Leskovec, J., Adamic, L. A., and Huberman, B. A. 2007. The dynamics of viral marketing. ACM Trans. Web 1, 1 (May 2007).*
Coyle, M. and Smyth, B. 2007. Supporting intelligent Web search. ACM Trans. Internet Technol. 7, 4 (Oct. 2007).*

* cited by examiner

*Primary Examiner* — Imad Hussain
(74) *Attorney, Agent, or Firm* — Zilka-Kotab, PC

(57) ABSTRACT

A system, method, and computer program product are provided for altering an experience of a user, based on information associated with a party to a communication associated with the user. In use, a communication associated with a user is identified. Additionally, at least one other party to the communication is identified. Further, information associated with the at least one other party is collected. Further still, an experience of the user is altered, based on the information.

14 Claims, 7 Drawing Sheets

SYSTEM, METHOD, AND COMPUTER PROGRAM PRODUCT FOR ALTERING AN EXPERIENCE OF A USER, BASED ON INFORMATION ASSOCIATED WITH A PARTY TO A COMMUNICATION ASSOCIATED WITH THE USER

FIELD OF THE INVENTION

The present invention relates to identifying relevant data, and more particularly to identifying relevant data based on collected information.

BACKGROUND

Relevancy of data is of increasing importance in modern systems. For example, search engines and ad matching engines may seek the most relevant data to present to a user. However, traditional techniques utilized for identifying relevant data have generally exhibited various limitations. Just by way of example, the opinion and behavior of users are often used by such traditional techniques in order to determine the relevancy of data. Thus, if more users select particular search results received from a search engine as opposed to other search results, the selected search results may be identified as more relevant than the other search results.

Unfortunately, techniques for selecting which users to learn from have conventionally been inflexible. For example, the manner in which relevant users are identified has been limited, thus further limiting the amount of information utilized in identifying relevant data. There is thus a need for addressing these and/or other issues associated with the prior art.

SUMMARY

A system, method, and computer program product are provided for altering an experience of a user, based on information associated with a party to a communication associated with the user. In use, a communication associated with a user is identified. Additionally, at least one other party to the communication is identified. Further, information associated with the at least one other party is collected. Further still, an experience of the user is altered, based on the information.

DETAILED DESCRIPTION

Figure 1:
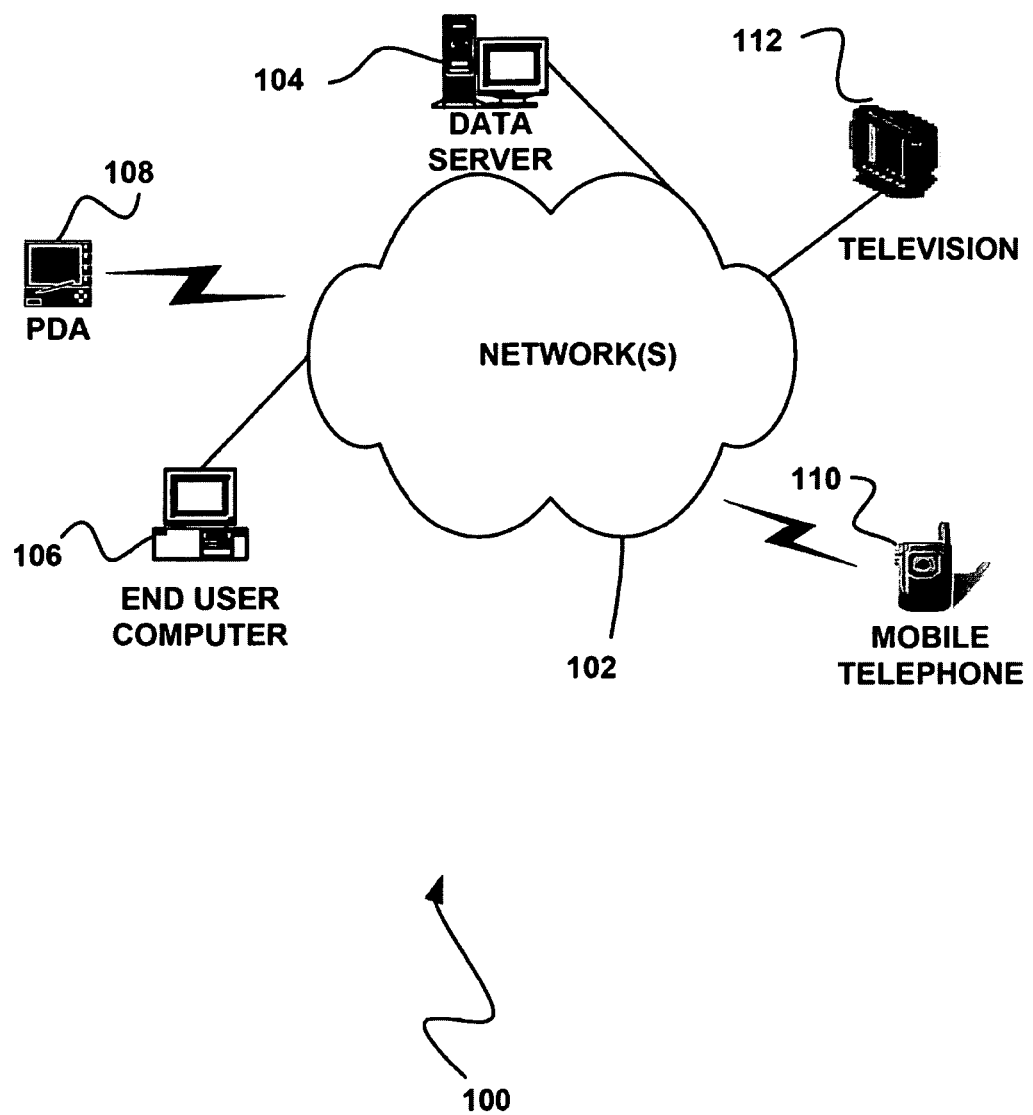
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
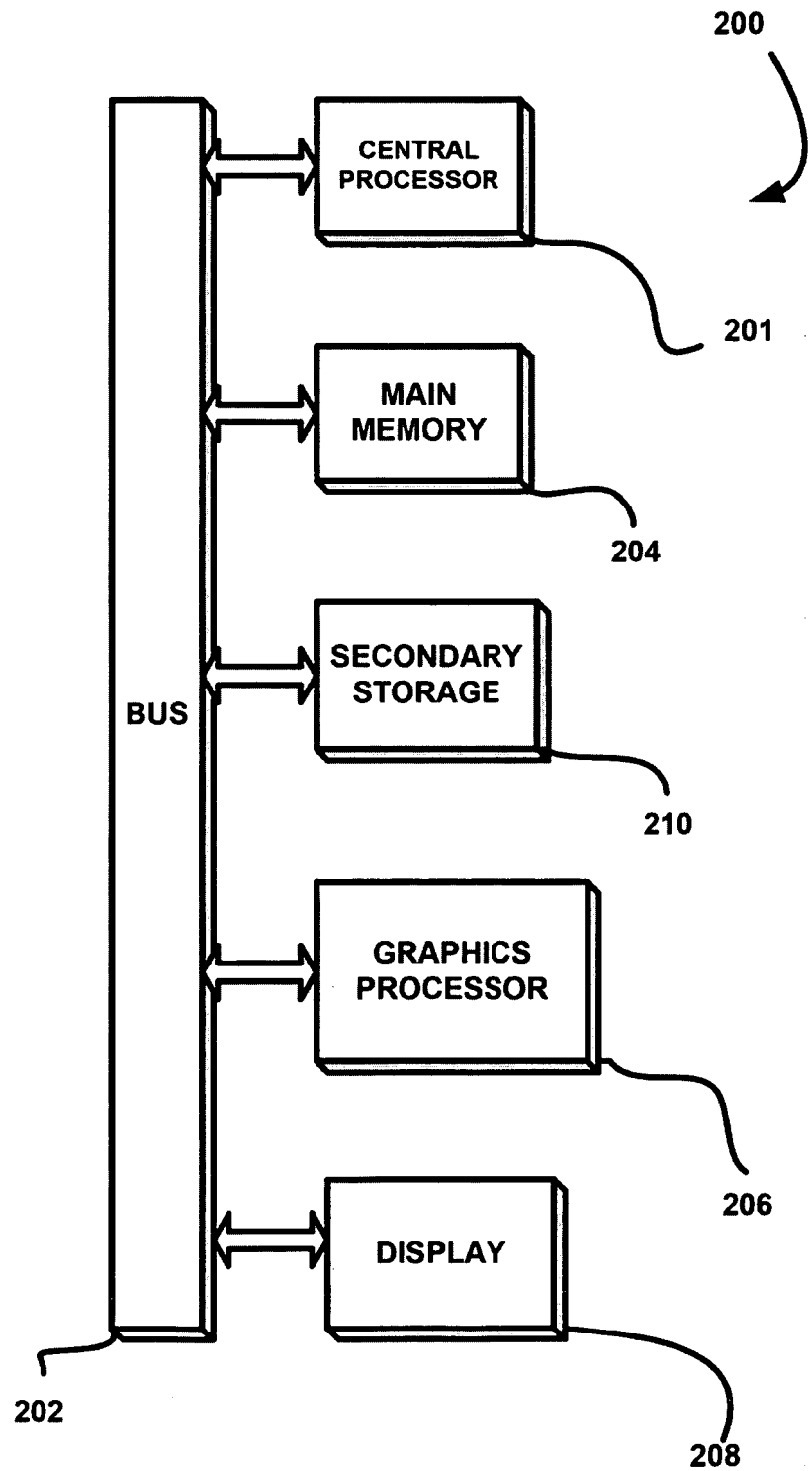
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
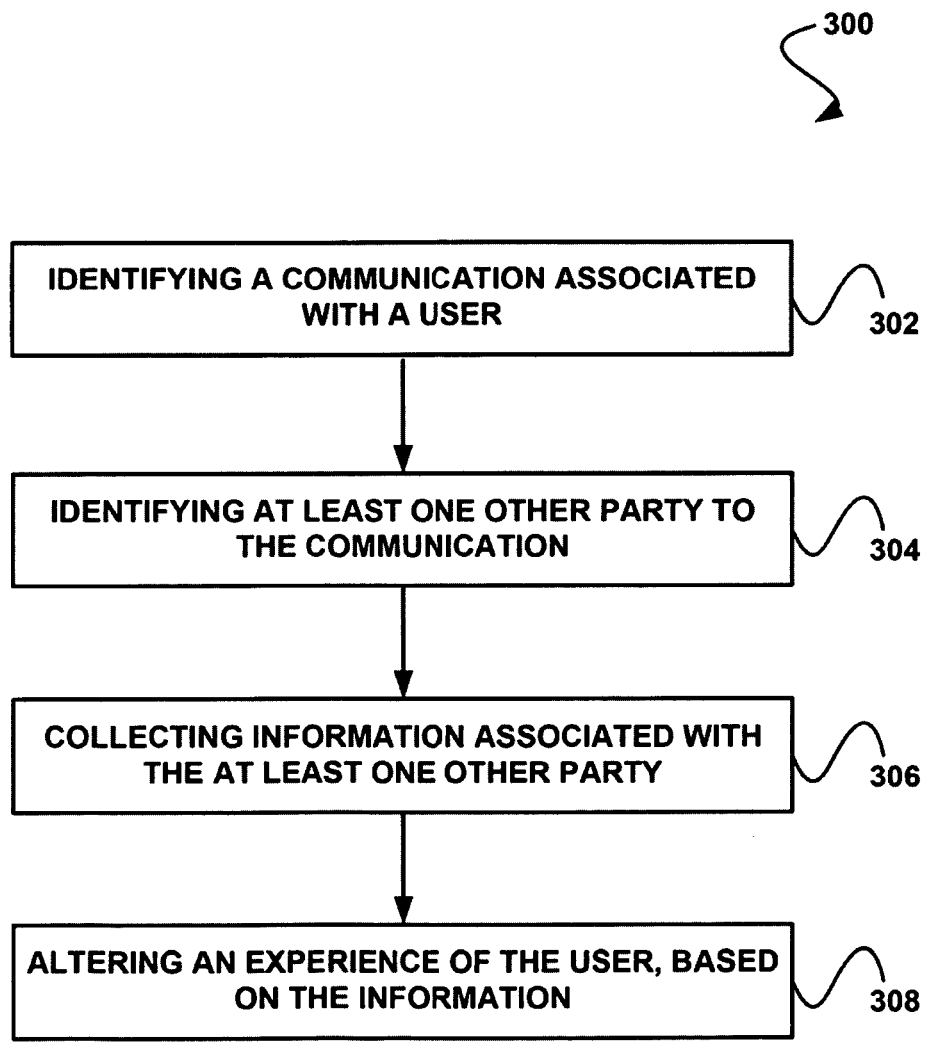
FIG. 3 illustrates a method for altering an experience of a user, based on information associated with a party to a communication associated with the user, in accordance with one embodiment.

FIG. 3 shows a method 300 for method for altering an experience of a user, based on information associated with a party to a communication associated with the user, in accordance with one embodiment. As an option, the method 300 may be carried out in the context of the details of FIGS. 1 and/or 2. Of course, however, the method 300 may be carried out in any desired environment.

As shown in operation 302, a communication associated with a user is identified. In one embodiment, the communication may include a textual communication. For example, the communication may include an instant messaging communication, an electronic message communication, etc. In another embodiment, the communication may include a vocal communication. For example, the communication may include a telephone call. Of course, however, any communication that can be associated with the user may be identified.

In addition, the user may include any user capable of being associated with the communication. For example, the user may include an individual, a business entity, a household, etc. Further, the user may include a user of a device (e.g. mobile device, etc.) utilized with respect to the communication. Such device may optionally include any of the devices described above with respect to FIGS. 1 and/or 2.

In one embodiment, the communication may be identified by accessing stored data. For example, a telephone call log of the user may be accessed (e.g. from a cellular phone, house phone, an online account, etc. of the user) for identifying the communication. In another example, an instant messaging history, electronic message history, a short message service (SMS) history, etc. of the user may be accessed for identifying the communication. Of course, however, the communication may be identified in any manner.

Moreover, the communication may be associated with the user in any manner. In one embodiment, the user may have initiated the communication. For example, the user may have placed a telephone call, sent an SMS message, sent an instant message, sent an electronic message, etc. In another embodiment, the user may have received the communication. For example, the user may have received a telephone call, an SMS message, an instant message, an electronic message, etc.

Additionally, at least one other party to the communication is identified. See operation 304. In one embodiment, the other party may have initiated the communication. In another embodiment, the other party may include a recipient of the communication. Of course, however, any other party to the communication may be identified.

Also, the other party may be identified in any desired manner. Just by way of example, the other party may be identified via the stored data (e.g. telephone call log, etc.) utilized to identify the communication. The stored data may optionally indicate an identifier of the other party (e.g. a telephone number, an electronic message address, etc. of the other party). Thus, such identifier of the other party may be utilized for identifying the other party to the communication.

Further, as shown in operation 306, information associated with the at least one other party is collected. In the context of the present description, the information may include any data, facts, descriptions, etc. associated with the other party. In one embodiment, the information may include one or more activities performed by the other party. For example, the activities may include a selection of one or more online search engine results, online advertisements, links, etc. by the other party. In yet another example, the activity may include an online purchase of one or more products by the other party.

In another embodiment, the information may include one or more communications made by the other party to other entities (e.g. organizations, businesses, etc.). For example, the information may include phone calls, electronic messages, instant messages, etc. made by the other party to businesses such as restaurants, retailers, service providers, etc. As an option, the entities may include any entities capable of being a subject of an online search (e.g. via a search of business listings, etc.). In this way, one or more entities that may optionally be the subject of an online search may be identified.

In another example, the information may include one or more communications made by the other party to other individuals. For example, the information may include phone calls, SMS messages, electronic messages, instant messages, etc. made by the other party to one or more individuals. As a result, the information may indicate indirect relationships established between the user and other individuals.

Further still, as shown in operation 308, an experience of the user is altered, based on the information. In one embodiment, the experience may include an advertisement presented to the user. Optionally, the advertisement presented to the user may be altered by selecting the advertisement based on the information, customizing the advertisement based on the information, etc. Just by way of example, the advertisement selected to be presented to the user may be an advertisement for a product purchased by the other party, an advertisement for a product searched for by the other party, an advertisement for a business with which the other party communicated, etc.

In another embodiment, the experience may include results of a network search. As an option, the network search may include a search for information over a network resulting in a list of search results. Such search may be performed by the user, as an option. For example, an online search engine may return the list of search results, and optionally one or more advertisements, to the user in response to a search query performed by the user.

Additionally, in one embodiment, the results of the network search may be altered by ordering the search results in the list. As an option, the search results may be ordered based on a relevancy to the user indicated by the information. For example, if the information associated with the other party indicates that the other party communicated with a particular business included in the search results, purchased a particular product included in the search results, etc. such search result entry may be identified as more relevant to the user than other search result entries. Thus, the more relevant search result entry may optionally be ordered at the top of the search results in the list.

As another option, the network search may be carried out utilizing a device associated with the user (e.g. the mobile device, etc.). For example, the network search may be carried out utilizing the personal digital assistant (PDA) device 108, the mobile phone device 110, etc. shown in FIG. 1. In this way, information associated with one or more parties to the communication associated with the user may be used to alter the experience of the user (e.g. for providing relevant content to the user, etc.). Altering the user experience in this manner may accordingly allow the user experience to be altered using information beyond information associated with behaviors, preferences, etc. of the user (e.g. including using information associated with other parties that may not necessarily include the information associated with the user).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
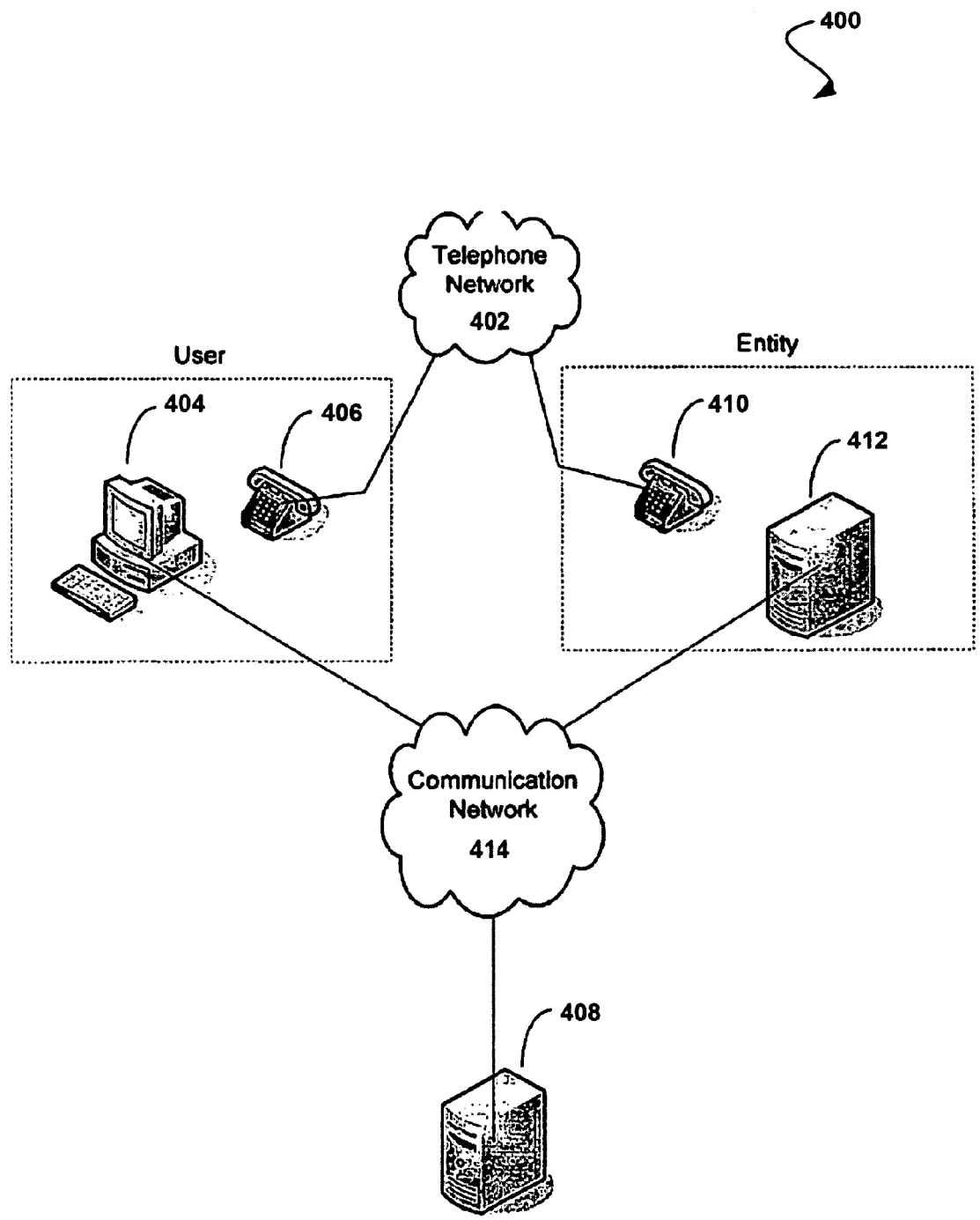
FIG. 4 illustrates a diagram of an illustrative computer system environment capable of being utilized for altering an experience of a user, based on information associated with a party to a communication associated with the user, in accordance with another embodiment.

FIG. 4 illustrates a diagram of an illustrative computer system environment 400 capable of being utilized for altering an experience of a user, based on information associated with a party to a communication associated with the user, in accordance with another embodiment. As an option, the system 400 may be implemented in the context of the details of FIGS. 1-3. Of course, however, the system 400 may be implemented in any desired environment. Further, the aforementioned definitions may equally apply to the description below.

The computer system environment 400 of FIG. 4 includes communication network 414, telephone network 402, user computer 404, server 408 on which a search engine is based, and server 412 on which a business' website is hosted. The computer system environment 400 also includes a user telephone 406 and a business telephone 410. Communication network 414 may include any suitable wired and/or wireless communication medium or media for exchanging data between two or more computers (e.g., a server and a client), including the Internet. Telephone network 402 may include any suitable wired and/or wireless communication media or media for exchanging voice data between two or more telephones.

User computer 404 may include any suitable computing device for sending and receiving data over a communication network, such as a desktop personal computer, a laptop personal computer, a personal digital assistant (PDA), a web-enabled television set (connected via cable, satellite, fiber, or any other suitable method), or a smart phone (including a mobile telephone), among others. Servers 408 and 412 may include any suitable computing device for sending data to and receiving data from one or more client computing devices over a communication network. Telephones 406 and 410 may be implemented as any suitable device for exchanging voice data between two points, such as traditional wired telephones or cellular telephones.

While server 408, for example, is shown as a single server, it may be implemented in some embodiments as a network of computers sharing processing and storage demand. In addition, while FIG. 4 shows telephone network 402 as separate from communication network 414, in other embodiments the computer system environment 400 may include telephones that communicate over communication network 414, such as telephones employing Voice over Internet Protocol (VoIP). It should be further appreciated that while FIG. 4 illustrates telephones, in other optional embodiments the computer system environment 400 may operate without telephones or without telephones that are distinct from computing devices (e.g., smart phones).

Additionally, while FIG. 4 shows telephone 410 and server 412 grouped together as an "entity," embodiments of the computer system environment 400 may operate in systems in which a telephone for an entity is in a different location from the server hosting the website for the entity, or in which an entity does not have a server hosting a website. Further, while FIG. 4 illustrates a user computer 404 as remote from server 408, in one embodiment of the computer system environment 400 the user computer 404 and the server 408 may be the same computing device.

Figure 5:
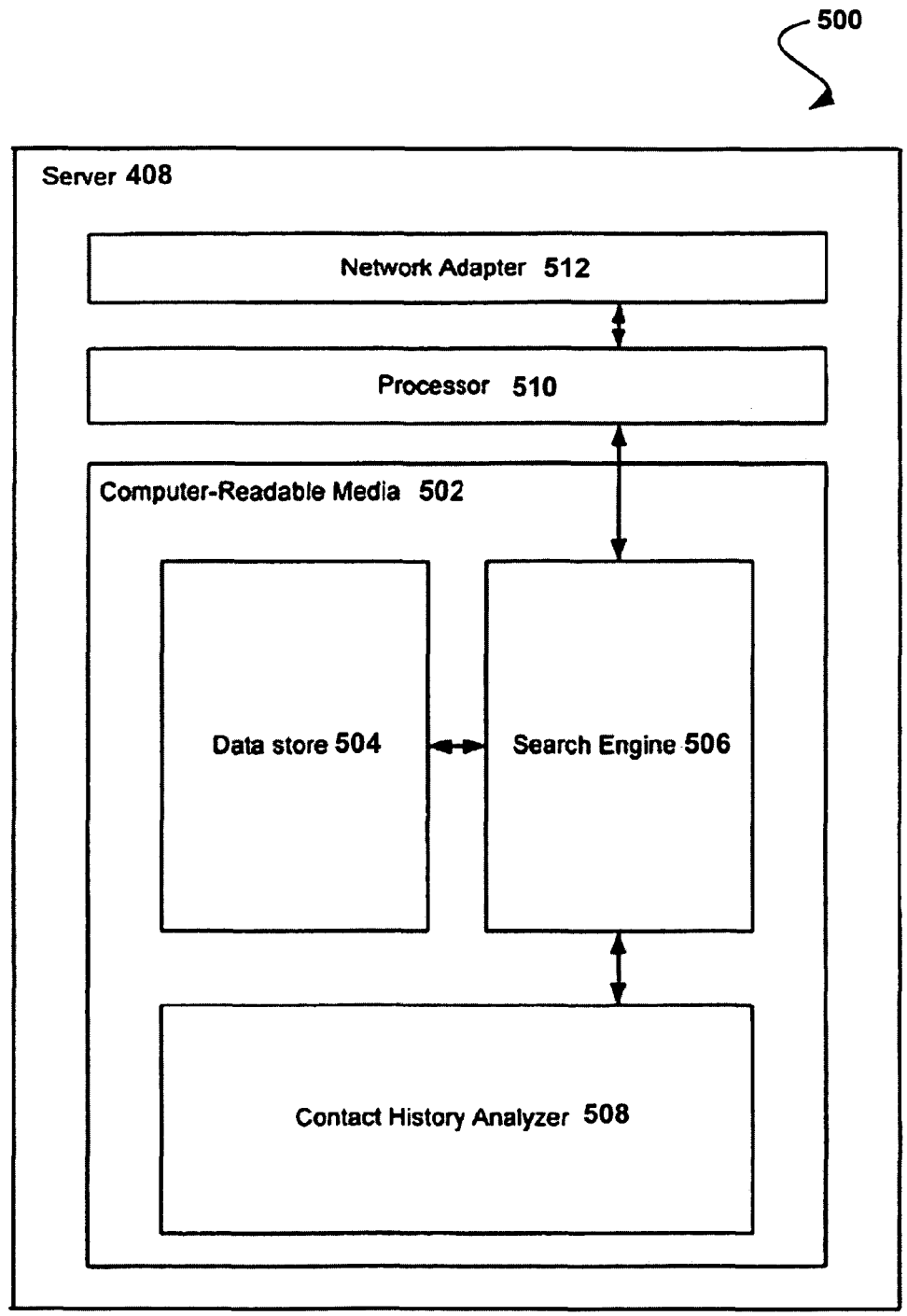
FIG. 5 illustrates an exemplary server capable of being utilized for altering an experience of a user, based on information associated with a party to a communication associated with the user, in accordance with yet another embodiment.

FIG. 5 illustrates an exemplary server 500 capable of being utilized for altering an experience of a user, based on information associated with a party to a communication associated with the user, in accordance with yet another embodiment. As an option, the server 500 may be implemented in the context of the details of FIGS. 1-4. For example, the server 500 may optionally include the server 408 of FIG. 4. Of course, however, the server 500 may be implemented in any desired environment. Further, the aforementioned definitions may equally apply to the description below.

It should be appreciated that FIG. 5 is intended neither to be a depiction of necessary components for a computing device to operate as a server with embodiments of FIGS. 1-4, nor a comprehensive depiction. Server 500 includes network adapter 512 to communicate with other devices connected to a network (e.g. such as for connecting to the network 414 of FIG. 4 to communicate with user computer 404 of FIG. 4). Server 500 also includes computer-readable media 502 for storing data to be processed and/or instructions to be executed by a processor 510. Processor 510 enables processing of data and execution of instructions. The data and instructions may be stored on the computer-readable media 502 and may, for example, enable communication between components of the server 500.

In accordance with some embodiments, the data and instructions stored on computer-readable media 502 may include a data store 504. The data store 504 may optionally include information to be examined by a search engine 506 in response to a user search query received by network adapter 512. The data store 504 may include information of any type, including information on businesses such as business names, business types, addresses, phone numbers, web site addresses, and electronic mail (e-mail) addresses. It should be appreciated that this list is merely illustrative, and other embodiments may operate with search engines searching data stores including information of any type or types. Search engine 506 may be implemented in any suitable manner, as embodiments may operate with any search engine capable of examining a data store based on a query.

In one embodiment, search engine 506 may begin searching data store 504 for information relating to a query received from a user using both the query itself and other information known about the user, another party with which the user communicated, and the query. Information about the user, the other party and the query may be stored in a contact history analyzer 508 stored on computer-readable media 502. Contact history analyzer 508 may be implemented in any suitable manner, examples of which are discussed below.

In one embodiment, contact history analyzer 508 may collect and store information concerning the "online" activities of users (e.g., as users interact with a web page for a search engine). This "online" activity data may be called web search data. The web search data may include any information that a server can collect while a user is interacting with its web page. For example, the web search data may include: an identification of a user, such as an identification stored in a Hypertext Transfer Protocol cookie stored on the user's computer, an identification of a computer the user is using to interact with the web page (e.g., an Internet Protocol address or a Medium Access Control address), or a username used by the user when using the web site; search queries entered by the user; times the search queries were entered by the user; results sent to the user in response to search queries; and results electronically selected by the user (e.g., results with associated hyperlinks clicked on by the user). It should be appreciated that this list is merely illustrative, and other embodiments may operate a contact history analyzer storing any type or types of information.

In another embodiment, the contact history analyzer 508 may collect and store information on the "offline" activities of people. This information may include any type of information about people that is electronically storable. For example, this offline activity information may include telephone calls made by people, purchases made by people (using, for example, credit cards), and/or locations visited by people. In addition, contact history analyzer 508 may store information regarding times of offline activities, lengths of the offline activities (e.g., length of a telephone call), origins of the offline activities (e.g., a telephone number from which a telephone call was made), and destinations of offline activities (e.g., a telephone number to which a telephone call was made). It should be appreciated that this list is merely illustrative, as other embodiments may operate a contact history analyzer storing any type of information. As shown below, in one embodiment, the information collected and stored by the contact history analyzer 508 may be used in selecting and ordering search results for users of the search engine 506.

Further, it should be appreciated that in one embodiment, users may be able to volunteer to be monitored users by providing identifying information to the contact history analyzer 508. For example, a user may enter his or her telephone number(s) into the search engine's web page, and thereby provide the contact history analyzer 508 with information to determine an association between a user and a person, rather than relying on the contact history analyzer 508 to determine an association over time.

Figure 6:
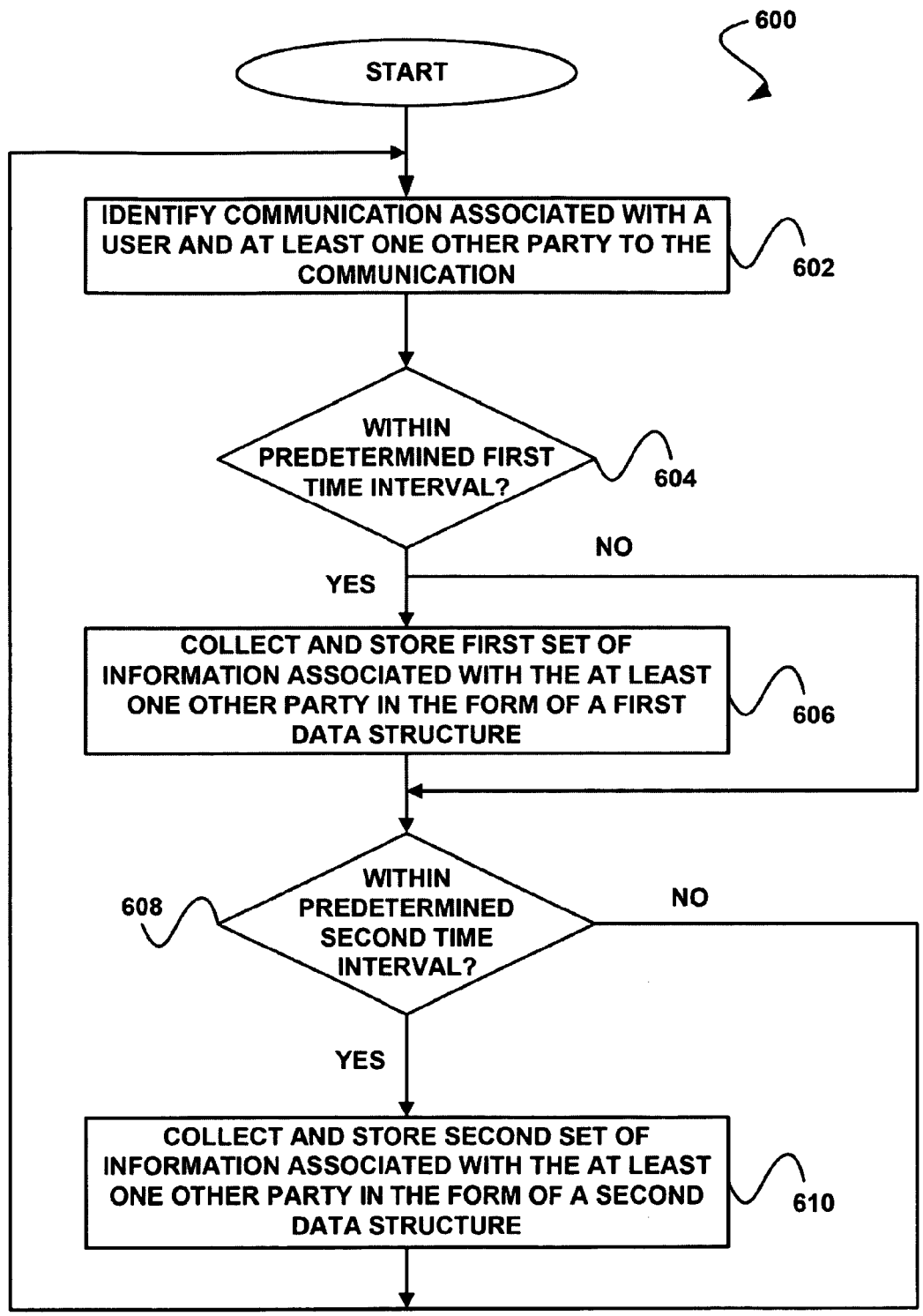
FIG. 6 illustrates a method for collecting and storing a set of information associated with at least one other party in the form of a data structure, in accordance with one embodiment.

FIG. 6 shows a method 600 for collecting and storing a set of information associated with at least one other party in the form of a data structure, in accordance with one embodiment. As an option, the method 600 may be carried out in the context of the details of FIGS. 1-5. For example, the method 600 may be carried out utilizing the server 500 of FIG. 5. Of course, however, the method 600 may be carried out in any desired environment. Again, the aforementioned definitions may equally apply to the description below.

As shown in operation 602, a communication associated with a user and at least one other party to the communication is identified. Just by way of example, the communication may be between the user and the other party. As an option, the communication may be identified via a communication history (e.g. a telephone call log, etc.) associated with the user.

Further, a contact of other party may also optionally be identified. In one embodiment, the contact of the other party may be identified utilizing a contact list associated with the other party. Such contact list may be stored in a communication device utilized by the other party, for example. In another embodiment, the contact of the other party may be identified based on an identified communication between the other party and the associated contact. In this way, the contact may include another party indirectly related to the user that is identified. Of course, it should be noted that any degree of indirect contacts may be identified.

Additionally, in decision 604 it is determined whether the communication was performed within a predetermined first time interval. In the context of the current embodiment, the predetermined first time interval may include any interval of time that is predefined. For example, the first time interval may include the most recent hour, day, week, etc. In one embodiment, the time since the communication was performed may be determined (e.g., by examining a log, record, history, etc. associated with the communication) and compared against the predetermined first time interval.

If it is determined in decision 604 that the communication was performed within the predetermined first time interval, then in operation 606 a first set of information associated with the other party (and optionally the contact of the other party) is collected and stored in the form of a first data structure. In one embodiment, the first data structure may include a graph. For example, the first data structure may include a graph that defines and stores relationships between two or more parties. Such relationships may be created based on communications between the parties, as an option. In embodiments, the first data structure may include a linked list, an array and/or any other data structure capable of storing the first set of information.

In another embodiment, the first set of information may indicate any relationships created between the other party and contacts of the other party during the predetermined first time interval. For example, the first set of information may include relationships between the user, the other party, and other individuals, businesses, households, etc. In one embodiment, the first set of information may identify additional communications between the other party and the contacts. In another embodiment, the first set of information may be collected from telephone call logs, records, instant messaging and electronic message histories, or any other resource containing such relationship information. In this way, networks of relationships between the user, the other party and the contacts may be stored in the first data structure.

Additionally, in another embodiment, a context of the first set of information may be identified. With respect to the present embodiment, the context may include any data describing a context of the first set of information. Such context may also optionally be stored in the first data structure.

In one embodiment, the context may include a time associated with the first set of information. For example, the context may include a time at which a communication occurred. In still another embodiment, the context may include a preference of the other party. The preference may be for particular products, brands, etc. (e.g. with respect to competing products, brands, etc.). In addition, the preference may be determined based on activity of the other party (e.g. the other party may consistently visit a particular web page online, etc.).

In yet another embodiment, the context may include an interest of the other party. For example, the context may include one or more topics of interest of the other party. In still another embodiment, the context may include an identification of the other party. For example, the context may include a name of the other party, an address of the other party, a phone number of the other party, an occupation of the other party, etc.

In another embodiment, the context may include an activity of the other party. For example, such activity may include online browsing of the other party, online purchases of the other party, etc. In a further embodiment, the context may include a location of the other party (e.g. a geographical location, etc.). In this way, the context of the first set of information associated with the other party may be utilized as a recommendation of data (e.g. websites, products, etc.) associated with that context, which may add to the relevancy of the data.

Additionally, in another embodiment, the first data structure may include a time identifier. For example, as noted above, the first data structure may include a time stamp indicating when a communication occurred. In this way, communications that may be associated with a time-sensitive context may be identified in the first data structure. Additionally, the time associated with the first set of information may be used to identify the communication as being a recent, short term communication.

If it is determined in decision 604 that the communication was not performed within the predetermined first time interval (decision 604) or in response to the collection and storage of the first set of information (operation 606), it is determined whether the communication was performed within a predetermined second time interval. Note decision 608. In the context of the current embodiment, the predetermined second time interval may include any interval of time greater than the predetermined first time interval. In one embodiment, the time since the communication was performed may be determined (e.g., by examining a log, record, history, etc.) and compared against the predetermined second time interval.

If it is determined in decision 608 that the communication was performed within the predetermined second time interval, then in operation 610 a second set of information associated with the other party is collected and stored in the form of a second data structure. In one embodiment, the second data structure may be similar to the first data structure. In another embodiment, the second data structure may be different from the first data structure.

For example, the second data structure may be a long term relation data structure (e.g. including the second set of information indicating any relationships created between the other party and contacts of the other party during the predetermined second time interval, etc.), whereas the first data structure may be a short term data structure (e.g. including the second set of information indicating any relationships created between the other party and contacts of the other party during the predetermined first time interval, etc.).

As an option, the second data structure may only store the second set of information indicating relationships between parties with repeated (e.g. ongoing, etc.) communications. Thus, in another embodiment, the second set of information may be stored in the form of a second data structure only if information regarding the other party has already been stored. For example, the second set of information may be stored only if the other party is already recognized as an existing contact. In this way, only significant relationships involved in prior communications may be stored in the second data structure, thereby maximizing the quality of stored data in addition to maximizing storage and performance. To this end, the second set of information may include relationships between the user, the other party, and other individuals, businesses, households, etc.

Additionally, in another embodiment, a context of the second set of information may be identified. Optionally, such context may be stored in the second data structure. The context may include a time associated with the second set of information, a preference of the other party, an identification of the other party, an interest o the other party, an activity of the other party, etc.

In still another embodiment, the second data structure may store a weight/score relating to the second set of information. For example, the second data structure may include a score for each relationship indicating a number of communications made with respect to such relationship. In another embodiment, the weight/score may be altered based on one or more factors. For example, the weight/score may be increased when an additional communication associated with the relationship is identified. As a result, parties to relationships with a larger quantity of communications may be weighted/scored higher than parties to relationships with fewer communications.

Further, if it is determined in decision 608 that the communication was not performed within the predetermined second time interval, then the method returns to operation 602. In this way, parties related to the user, either directly or indirectly, may be identified via the first data structure and optionally the second data structure based on the communications associated with the user. Furthermore, the first set of information and optionally the second set of information associated with the related parties, in addition to a context associated with such first set of information and optionally second set of information may be utilized for altering an experience of the user.

Figure 7:
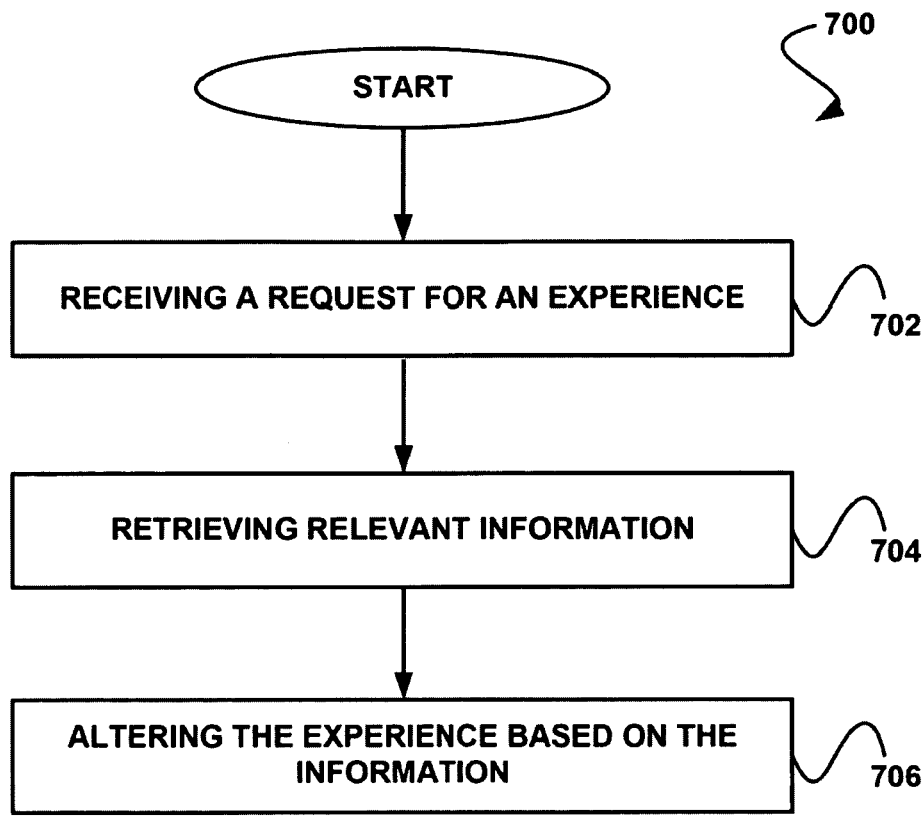
FIG. 7 illustrates a method for collecting information associated with a party, in accordance with another embodiment.

FIG. 7 shows a method 700 for collecting information associated with a party, in accordance with another embodiment. As an option, the method 700 may be carried out in the context of the details of FIGS. 1-6. For example, the method 600 may be carried out utilizing the server 500 of FIG. 5. Of course, however, the method 700 may be carried out in any desired environment. Further, the aforementioned definitions may equally apply to the description below.

As shown in operation 702, a request for an experience is received. In one embodiment, the request may include a network search query. In another embodiment, the request may include the selection of an online link. In still another embodiment, the request may include a telephone call. In yet another embodiment, the request may include an SMS message, electronic message, etc. In another embodiment, the request may include browsing an interface, such as for example, a mobile online interface. In yet another embodiment, the request may be received from a user via device.

Additionally, as shown in operation 704, relevant information is retrieved. In one embodiment, the relevant information may be retrieved from a database, including for example, the data store 504 shown in FIG. 5, the first data structure and/or second data structure described in FIG. 6, etc. Of course, however, the relevant information may be retrieved from any location capable of storing the relevant information.

In one embodiment, the relevant information may include activities of one or more parties related to the user. These activities may be stored in a graph data structure next to the party that initiated the activities. A network of parties may lead to indirect relations (e.g. a first party associated with a second party via a third party).

In another embodiment, the relevant information may include previous communications associated with the user. In another embodiment, the relevant information may include information associated with at least one other party that previously communicated with the user. For example, the relevant information may include one or more activities performed by the other party.

Also, in another embodiment, the relevant information may include a collective network of parties related to the user via one or more communications associated with the user. For example, the relevant information may include a collective short term network of parties with which the user has recently communicated. In another example, the relevant information may include a collective longer term network of parties with which the user has repeatedly communicated. Of course, information associated with the collective short term network may be weighted higher than information associated with the collective long term network.

Still yet, the relevant information may be identified based on a weight of an associated party. The weight may be a based on a number of communications between the party and the user, as an option. For example, only the information associated with the top 10 associated parties having the highest weight/score may be retrieved. In another example, only the information associated with the parties having a time identifier earlier than a predetermined time may be retrieved.

Furthermore, as shown in operation 706, the experience is altered based on the information. In one embodiment, the altering may include ordering a list of search results in response to network search query. For example, each of the search results may receive a particular score based on a party associated therewith, and the ordering may be based on the score.

In another embodiment, the list of search results may be ordered based on a response of one or more parties associated with each search result. In one embodiment, the response may be achieved by comparing each search result against one or more factors of a collective network of parties related to the user. In one embodiment, the collective network may include a collective short term network (e.g. for which a first set of information is stored in a short term data structure) and/or a collective long term network (e.g. for which a second set of information is stored in a long term data structure). The comparison may determine responses by parties of the collective short term network and/or the collective long term network to each search result. Such responses may include selection of a search result, non-selection of the search result, etc.), in one embodiment. In another embodiment, the determination may include a basic graph lookup where the user is the starting point and for every related party interests and activities stored in the short term data structure and/or the long term data structure are compared to the search result.

For example, if one search result includes the name of a business, and the relevant information indicates that one or more parties associated with the user have communicated with the business online, via telephone, etc., such parties communication with the business may be interpreted as a recommendation of the business. Therefore, the search result may be ranked higher than other search results and may appear before the other search results on the list.

In another example, a user may submit a search query for a particular news article that is related to the company that the user works at or is related to, where such article concerns an event that has occurred recently. The user may type the name of the company in the search query, and the particular news article may appear as one of the list of search results. By identifying relevant information, it may be determined that the particular article is more relevant than others on the search results list (e.g. if one or more parties associated with the user have showed interest in the particular article), and the particular article may be ranked higher than others on the search results list. As a result, the particular article may appear higher on the list of search results.

In yet another example, if one search result includes a particular interest, and the relevant information indicates that one or more parties associated with the user have similar interests, the similar interests may be interpreted as a recommendation of the search result. Therefore, the search result may be ranked higher than other search results and may appear before the other search results on the list.

In this way, the relationship between parties associated with a communication, in addition to information associated with one of the parties, may be used in order to add more relevancy to current search techniques provided another one of the parties. Thus, information associated with those parties in relation to a user through communication with the user may be added to an information repository from which information relevant to the user may be determined for altering of the experience may be performed.

In another embodiment, the altering may include selecting one or more advertisements to display to the user. For example, if the search query includes information about a particular service, and one or more parties associated with the user have communicated with a business that provides the service, one or more advertisements including information about the business may be displayed to the user.

As an option, the altered experience may be further altered based on additional relevant information. In one embodiment, a statistical process may utilize the altered experience (e.g. search results, etc.) for determining whether additional information is relevant to the altered experience. For example, the additional relevant information may be associated with additional parties related to the user. Such additional parties may optionally be different from the parties associated with the relevant information utilized for the first alteration of the experience (in operation 706).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium embodying a computer program product, comprising computer code for:
   identifying by a system a communication between a user and another party;
   determining by the system whether the identified communication was performed within a first predetermined time interval;
   collecting by the system a first set of information associated with the other party and storing the first set of information in a short term data structure of a hardware database of the system upon determining that the identified communication was performed within the first predetermined time interval, the first set of information including:
      a selection by the other party of one or more online search engine results,
      a selection by the other party of one or more online advertisements,
      a selection by the other party of one or more online links,
      an online purchase by the other party of one or more products, and
      one or more communications made by the other party to additional entities;
   determining by the system whether the identified communication was performed within a second predetermined time interval greater than the first predetermined time interval, upon determining that the identified communication was not performed within the first predetermined time interval;
   determining by the system whether a second set of information associated with the other party has already been stored in the short term data structure of the hardware database or a long term data structure of the hardware database, upon determining that the identified communication was performed within the second predetermined time interval;
   collecting by the system the first set of information and storing the first set of information in the long term data structure of the hardware database only upon determining that the second set of information has already been stored in the short term data structure of the hardware database or the long term data structure of the hardware database; and
   altering, by the system, data presented to a device of the user, utilizing the short term data structure of the hardware database and the long term data structure of the hardware database.

2. The computer program product of claim 1, wherein the communication includes a textual communication.

3. The computer program product of claim 2, wherein the communication includes at least one of an instant messaging communication and an electronic message communication.

4. The computer program product of claim 1, wherein the communication includes a vocal communication.

5. The computer program product of claim 4, wherein the vocal communication includes a telephone call.

6. The computer program product of claim 1, wherein altering the data presented to the device of the user further includes presenting an advertisement to the device of the user.

7. The computer program product of claim 6, wherein altering the data presented to the device of the user includes:
   identifying a search query sent by the user, where the search query is part of a network search;
   determining a list of search results in response to the search query,
   ordering the search results in the list, based on the information, and
   returning the ordered search results to the device of the user.

8. The computer program product of claim 7, wherein the network search is carried out utilizing a mobile device.

9. The computer program product of claim 1, wherein altering the data presented to the device includes altering an advertisement presented to the user by selecting the advertisement utilizing the short term data structure and the long term data structure, where the advertisement is for a product purchased by the other party.

10. The computer program product of claim 1, wherein the information associated with the other party indicates that the at least one other party communicated with a particular business included in the search results.

11. The computer program product of claim 1, wherein if at least one result of a network search includes a particular interest and the information indicates that one or more parties associated with the user have similar interests, then the similar interests are interpreted as a recommendation of the at least one result, and the at least one result is ranked higher than other results of the network search.

12. A method, comprising:
- identifying by a system a communication between a user and another party;
- determining by the system whether the identified communication was performed within a first predetermined time interval;
- collecting by the system a first set of information associated with the other part and storing the first set of information in a short term data structure of a hardware database of the system upon determining that the identified communication was performed within the first predetermined time interval, the first set of information including:
  - a selection the other party of one or more online search engine results,
  - a selection by the other party of one or more online advertisements,
  - a selection by the other party of one or more online links,
  - an online purchase by the other party of one or more products, and
  - one or more communications made by the other party to additional entities;
- determining by the system whether the identified communication was performed within a second predetermined time interval greater than the first predetermined time interval, upon determining that the identified communication was not performed within the first predetermined time interval;
- determining by the system whether a second set of information associated with the other party has already been stored in the short term data structure of the hardware database or a long term data structure of the hardware database, upon determining that the identified communication was performed within the second predetermined time interval;
- collecting by the system the first set of information and storing the first set of information in the long term data structure of the hardware database only upon determining that the second set of information has already been stored in the short term data structure of the hardware database or the long term data structure of the hardware database; and
- altering, by the system, data presented to a device of the user, utilizing the short term data structure of the hardware database and the long term data structure of the hardware database.

13. A system, comprising:
a processor for:
- identifying by the system a communication between a user and another party;
- determining by the system whether the identified communication was performed within a first predetermined time interval;
- collecting by the system a first set of information associated with the other party and storing the first set of information in a short term data structure of a hardware database of the system upon determining that the identified communication was performed within the first predetermined time interval, the first set of information including:
  - a selection by the other party of one or more online search engine results,
  - a selection by the other party of one or more online advertisements,
  - a selection by the other party of one or more online links,
  - an online purchase by the other party of one or more products, and
  - one or more communications made by the other party to additional entities;
- determining by the system whether the identified communication was performed within a second predetermined time interval greater than the first predetermined time interval, upon determining that the identified communication was not performed within the first predetermined time interval;
- determining the system whether a second set of information associated with the other party has already been stored in the short term data structure of the hardware database or a long term data structure of the hardware database, upon determining that the identified communication was performed within the second predetermined time interval;
- collecting by the system the first set of information and storing the first set of information in the long term data structure of the hardware database only upon determining that the second set of information has already been stored in the short term data structure of the hardware database or the long term data structure of the hardware database; and
- altering, by the system, data presented to a device of the user, utilizing the short term data structure of the hardware database and the long term data structure of the hardware database.

14. The system of claim 13, wherein the processor is coupled to memory via a bus.

* * * * *